(12) United States Patent
Ferrier

(10) Patent No.: US 9,694,500 B1
(45) Date of Patent: Jul. 4, 2017

(54) MECHANISM WITH ONE SENSOR FOR PANEL PRESENT AND DOUBLE SHEET DETECTION FOR GRIPPERS

(71) Applicant: PHD, Inc., Fort Wayne, IN (US)

(72) Inventor: Daniel Ferrier, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 15/388,646

(22) Filed: Dec. 22, 2016

Related U.S. Application Data

(60) Provisional application No. 62/387,299, filed on Dec. 23, 2015.

(51) Int. Cl.
*B25J 15/04* (2006.01)
*B25J 15/02* (2006.01)

(52) U.S. Cl.
CPC .................. *B25J 15/022* (2013.01)

(58) Field of Classification Search
CPC ........................ B25J 15/022; B29C 49/4205
USPC ...... 294/197, 202, 203, 115, 116, 99.1, 198, 294/907; 269/32, 34
See application file for complete search history.

(56) References Cited

U.S. PATENT DOCUMENTS

| | | | | |
|---|---|---|---|---|
| 3,027,155 A | * | 3/1962 | Paterson | B25B 5/122 269/32 |
| 3,482,830 A | * | 12/1969 | Sendoykas | B25B 5/061 269/32 |
| 3,567,208 A | * | 3/1971 | Blatt | B25J 15/0206 294/197 |
| 4,462,585 A | | 7/1984 | Gieson et al. | |
| 4,593,948 A | | 6/1986 | Borcea et al. | |
| 5,503,378 A | * | 4/1996 | Schauss | B23Q 7/043 269/34 |
| 6,019,409 A | | 2/2000 | Steele et al. | |
| 6,115,898 A | * | 9/2000 | Sawdon | B25B 5/087 269/32 |
| 6,416,045 B1 | * | 7/2002 | Morroney | B25B 5/122 269/32 |
| 6,565,074 B1 | * | 5/2003 | Wheeler | B25B 5/16 269/32 |
| 6,641,189 B2 | | 11/2003 | Moilanen et al. | |
| 6,666,489 B2 | * | 12/2003 | Kruger | B25J 15/0226 294/197 |
| 6,948,708 B2 | | 9/2005 | Moilanen et al. | |
| 7,021,687 B2 | * | 4/2006 | Moilanen | B25B 5/087 294/116 |
| 7,300,082 B2 | | 11/2007 | Rogers et al. | |
| 7,543,815 B2 | | 6/2009 | Barazani et al. | |
| 7,837,247 B2 | * | 11/2010 | Waldorf | B25B 5/087 294/116 |

(Continued)

*Primary Examiner* — Paul T Chin
(74) *Attorney, Agent, or Firm* — Taylor IP, P.C.

(57) ABSTRACT

A sensor or switch mechanism is connected to a gripper mechanism and uses a pivotal cam link connected to the driving mechanism of the gripper. A cam slot in the cam link is configured to convert linear reciprocal motion of the driving mechanism of the gripper to amplified rotational motion of the pivotal cam link. A target on the cam link and a stationary sensor positioned proximate to an arc described by the target on rotation of the cam link allows the sensor or switch mechanism to distinguish between the gripper properly gripping a single workpiece and the gripper improperly gripping no workpiece and/or two or more workpieces.

20 Claims, 2 Drawing Sheets

(56) References Cited

U.S. PATENT DOCUMENTS

| | | | |
|---|---|---|---|
| 7,845,698 B2 * | 12/2010 | Jenkins | B25J 9/1005 294/115 |
| 8,104,810 B2 | 1/2012 | Holcomb et al. | |
| 8,136,803 B2 | 3/2012 | McIntosh et al. | |
| 8,152,214 B2 | 4/2012 | Williams et al. | |
| 8,454,069 B2 * | 6/2013 | Jenkins | B25J 9/1005 294/115 |
| 8,919,844 B1 * | 12/2014 | Mascorro | B25J 13/086 294/192 |

* cited by examiner

US 9,694,500 B1

MECHANISM WITH ONE SENSOR FOR PANEL PRESENT AND DOUBLE SHEET DETECTION FOR GRIPPERS

CROSS REFERENCE TO RELATED APPLICATIONS

This is a non-provisional application based upon U.S. provisional patent application Ser. No. 62/387,299, entitled "MECHANISM WITH ONE SENSOR FOR PANEL PRESENT AND DOUBLE SHEET DETECTION FOR GRIPPERS", filed Dec. 23, 2015, which is incorporated herein by reference.

BACKGROUND OF THE INVENTION

Grippers are mechanical devices characterized by one or more jaws that are reciprocally rotated or translated so that the working end of each jaw is moved together or apart by a motive device such as an electric motor, electric solenoid, pneumatic piston, or other fluid powered actuator. In many cases, the jaws of the gripper are responsible for transferring the force of the gripper to a workpiece such that the workpiece may then be moved, and/or rotated from one machine work station to another. The loading of the workpiece can fail in one of two ways. The first failure mode is characterized in that no workpiece is clamped between the jaws of the gripper. The second failure mode is characterized in that more than one workpiece is clamped between the jaws of the gripper. Each condition is undesirable because it often causes damage to the machine or causes machine down time.

It is known to use electronic sensors or switches to produce an output to signal whether loading failure has occurred or not. Current methods sense the relationship between a sensing object connected to the linear driving member, such as a piston rod, and the body of the gripper to determine one of the two failure conditions. When the workpiece is thin, the differential between the sensing object position when the gripper is clamped on one piece and its position on two pieces is small relative to the sensing object length in the direction of travel. In this case two sensors or switches are needed. A first sensor or switch is needed to sense whether there is at least one workpiece present, and a second sensor or switch is needed to sense that there are at least two workpieces present. The use of two sensors or switches in this way disadvantageously increases the cost, size, and weight of the gripper.

What is needed in the art is a way to reliably use a single sensor or switch to distinguish between the condition of having a gripper properly clamped on a single workpiece, and the condition of having a gripper improperly clamped on no workpiece or on two or more workpieces.

SUMMARY OF THE INVENTION

The following disclosure is directed to an improved sensor or switch mechanism design that converts the linear movement of a driving member to rotational motion via a pivoting linkage and a cam. The cam driven linkage amplifies travel of the sensing object. This allows the use of one sensor or switch to distinguish the difference between one and two or more workpieces. The use of one sensor or switch instead of using two sensors or switches decreases the overall cost, size, and weight of the gripper.

In accordance with one aspect of the present invention, there is provided a gripper and sensor or switch assembly. A gripper mechanism has a gripper body, an actuator connected to or integrated with the gripper body, a driving member connected to the actuator, and at least one movable jaw operably connected to the driving member. A sensor or switch mechanism is connected to the gripper mechanism and has a pivotal cam link. The pivotal cam link has a cam slot. A drive pin is connected to the driving member and engaged with the cam slot. The drive pin and the cam slot are configured to convert linear reciprocal motion of the driving member to rotational motion of the pivotal cam link. A target is attached to or integrated with the pivotal cam link. A sensor or switch is positioned proximate to an arc described by the target upon rotation of the pivotal cam link. The pivotal cam link, the cam slot, the target, and the sensor or switch are arranged so that the pivotal cam link pivots to place the target in a first position on the arc upon the at least one movable jaw closing upon no workpiece. The first position results in a first output of the sensor or switch. The pivotal cam link, the cam slot, the target, and the sensor or switch are further arranged so that the pivotal cam link pivots to place the target in a second position on the arc upon the at least one movable jaw closing upon a single workpiece. The second position results in a second output of the sensor or switch. The pivotal cam link, the cam slot, the target, and the sensor or switch are further arranged so that the pivotal cam link pivots to place the target in a third position on the arc upon the at least one movable jaw closing upon at least two workpieces. The third position results in a third output of the sensor or switch. The first output of the sensor or switch may or may not be the same as the third output of the sensor or switch.

In accordance with another aspect of the present invention, there is provided a sensor or switch mechanism for a gripper mechanism. The gripper mechanism has a gripper body, an actuator connected to or integrated with the gripper body, a driving member connected to the actuator, and at least one movable jaw operably connected to the driving member. A pivotal cam link of the sensor or switch mechanism has a cam slot. A drive pin is connected to the driving member and engaged with the cam slot. The drive pin and the cam slot are configured to convert linear reciprocal motion of the driving member to rotational motion of the pivotal cam link. A target is attached to or integrated with the pivotal cam link. A sensor or switch is positioned proximate to an arc described by the target upon rotation of the pivotal cam link. The pivotal cam link, the cam slot, the target, and the sensor or switch are arranged so that the pivotal cam link pivots to place the target in a first position on the arc upon the at least one movable jaw closing upon no workpiece. The first position results in a first output of the sensor or switch. The pivotal cam link, the cam slot, the target, and the sensor or switch are further arranged so that the pivotal cam link pivots to place the target in a second position on the arc upon the at least one movable jaw closing upon a single workpiece. The second position results in a second output of the sensor or switch. The pivotal cam link, the cam slot, the target, and the sensor or switch are further arranged so that the pivotal cam link pivots to place the target in a third position on the arc upon the at least one movable jaw closing upon at least two workpieces. The third position results in a third output of the sensor or switch. The first output of the sensor or switch may or may not be the same as the third output of the sensor or switch.

In accordance with yet another aspect of the present invention, there is provided a method of sensing the number of workpieces being gripped by a gripper mechanism. The gripper mechanism has a gripper body, an actuator connected to or integrated with the gripper body, a driving member connected to the actuator, and at least one movable jaw operably connected to the driving member. The method includes several steps. The first step is providing a pivotal cam link. The pivotal cam link has a cam slot. The second step is connecting a drive pin to the driving member and engaging the drive pin with the cam slot. The third step is configuring the drive pin and the cam slot to convert linear reciprocal motion of the driving member to rotational motion of the pivotal cam link. The fourth step is attaching or integrating a target with the pivotal cam link. The fifth step is positioning a sensor or switch proximate to an arc described by the target upon rotation of the pivotal cam link. The sixth step includes arranging the pivotal cam link, the cam slot, the target, and the sensor or switch so that the pivotal cam link pivots to place the target in a first position on the arc upon the at least one movable jaw closing upon no workpiece. The first position results in a first output of the sensor or switch. The sixth step further includes arranging the pivotal cam link, the cam slot, the target, and the sensor or switch so that the pivotal cam link pivots to place the target in a second position on the arc upon the at least one movable jaw closing upon a single workpiece. The second position results in a second output of the sensor or switch. The sixth step further includes arranging the pivotal cam link, the cam slot, the target, and the sensor or switch so that the pivotal cam link pivots to place the target in a third position on the arc upon the at least one movable jaw closing upon at least two workpieces. The third position results in a third output of the sensor or switch. The first output of the sensor or switch may or may not be the same as the third output of the sensor or switch. An advantage of the present invention is that it provides a way to reliably use a single sensor or switch to distinguish between the condition of having a gripper properly clamped on a single workpiece, and the condition of having a gripper improperly clamped on no workpiece or on two or more workpieces.

BRIEF DESCRIPTION OF THE DRAWINGS

The descriptions above and the function of this invention will be more clearly defined by reference to the following description of an embodiment in conjunction with the drawings included, wherein.

Corresponding reference characters indicate corresponding parts throughout the several views. The exemplification set out herein illustrates an embodiment of the invention, in one form, and such exemplification is not to be construed as limiting the scope of the invention in any manner.

DESCRIPTION OF INVENTION

For the purpose of discussion, parts contained in the multiple views of FIGS. 1 through 3C will be referenced individually by alphanumeric characters. The embodiments contained in FIGS. 1 through 3C illustrate examples of the invention and are not inclusive of all of its embodiments. Although FIGS. 1 through 3C show a gripper with a pneumatic actuator, it is understood that other embodiments could include a gripper having an electric motor, electric solenoid, or other fluid powered actuator. Although FIGS. 1 through 3C show a gripper with pivotal jaws, it is understood that other embodiments could include a gripper having parallel slidable jaws, or jaws that move from an unclamped position to a clamped position by way of any of several mechanisms.

Figure 1:
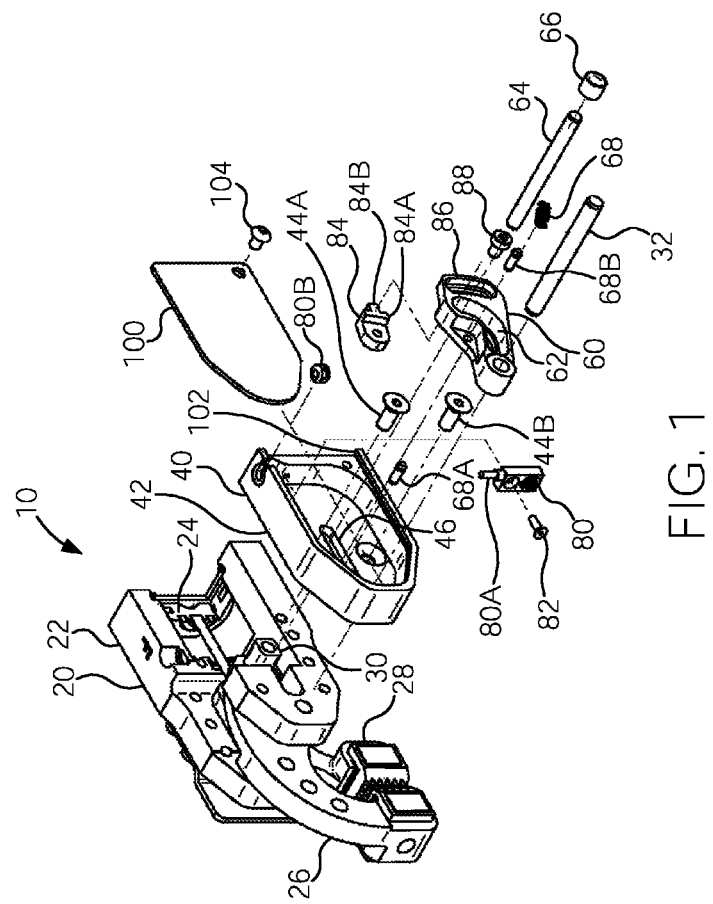
FIG. 1 shows an exploded isometric view of a gripper having a sensor or switch mechanism according to an embodiment of the present invention.
Figure 2:
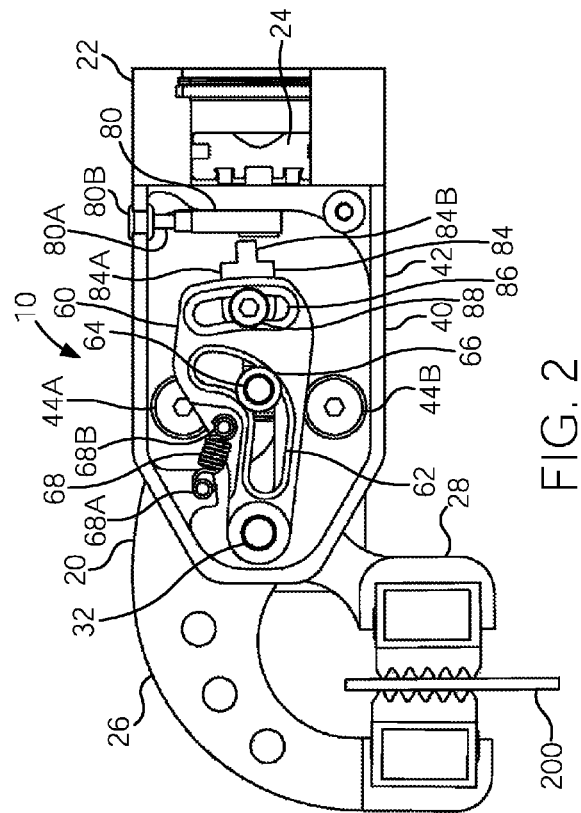
FIG. 2 shows a left hand view of a gripper having a sensor or switch mechanism according to an embodiment of the present invention.

Referring now to FIGS. 1 and 2, FIG. 1 shows an exploded isometric view of a gripper and sensor or switch assembly 10 according to an embodiment of the present invention. FIG. 2 shows a left hand view of a gripper and sensor or switch assembly 10 according to an embodiment of the present invention. The gripper and sensor or switch assembly is made up of a gripper mechanism 20 and a sensor or switch mechanism 40. The gripper mechanism 20 has a gripper body 22 which may have an integrated fluid powered actuator 24 as shown, or which may attach to an external fluid powered actuator 24. Alternately, the gripper mechanism 20 may be actuated by another kind of actuator, such as a linear electric motor or electric solenoid (not shown). The gripper mechanism has an upper gripper jaw 26 and a lower gripper jaw 28, at least one and possibly both of which are pivotally connected to the gripper body 22 by way of a pivot pin 32. Alternately, the upper gripper jaw 26 and the lower gripper jaw 28 may be slidably connected to or in other movably connected relationship with the gripper body 22 of the gripper mechanism 20. The fluid powered actuator 24 of the gripper mechanism 20 is connected to a driver 30, by which the fluid powered actuator 24 transmits force and motion to at least one of the upper gripper jaw 26 and the lower gripper jaw 28, causing the upper gripper jaw 26 and/or the lower gripper jaw 28 to pivot or translate between unclamped and clamped positions.

The sensor or switch mechanism 40 has a sensor or switch housing 42 that is attached to the gripper body 22 of the gripper mechanism 20 using two threaded switch housing mounting fasteners 44A and 44B. The pivot pin 32 upon which the upper gripper jaw 26 and/or lower gripper jaw 28 pivots, according to the embodiment of the gripper mechanism 20 in FIGS. 1 and 2, extends from the gripper body 22 through the sensor or switch housing 42, where a pivotal cam link 60 being disposed within the sensor or switch housing 42 also pivots upon the pivot pin 32. In the embodiment of pivotally attached upper gripper jaw 26 and/or lower gripper jaw 28, the pivotal cam link 60 may pivot on the same pivot pin 32 as the upper gripper jaw 26 and/or the lower gripper jaw 28, as shown, or may pivot on a separate pivot pin from the one on which the upper gripper jaw 26 and/or the lower gripper jaw 28 pivot, which separate pivot pin may or may not be exactly coaxially placed with the one on which the upper gripper jaw 26 and/or the lower gripper jaw 28 pivot. A linearly reciprocating drive pin 64 engages with the driver 30 so that the linearly reciprocating drive pin 64 is constrained to move with the driver 30 as actuated by the fluid powered actuator 24. The linearly reciprocating drive pin 64 passes through a clearance slot 46 in the sensor or switch housing 42 and engages a closed curved cam slot 62 in the pivotal cam link 60 by way of a roller 66.

When the gripper mechanism 20 moves from an open position to a closed position, and vice versa, the linearly reciprocating drive pin 64 reciprocates with the driver 30 and imparts a force on the pivotal cam link 60 by way of the roller 66 and the closed curved cam slot 62. An extension spring 68 is connected to the sensor or switch housing 42 and to the pivotal cam link 60 by way of extension spring pins 68A and 68B. The extension spring 68 imparts a moment on the pivotal cam link 60 to keep the roller 66 in contact with the outer surface of the closed curved cam slot 62. The closed curved cam slot 62 in the pivotal cam link 60 is shaped such that a small change in the position of the driver 30, and therefore in the position of the upper gripper jaw 26 and/or the lower gripper jaw 28, corresponds to a large angular displacement of the pivotal cam link 60. The closed curved cam slot 62 may be partially linear and partially arcuate as shown, or may be entirely arcuate, entirely linear, and/or may involve complex geometry such as the use of arcs of incrementally or progressively varying radii.

At an end of the pivotal cam link 60 distal from the pivot pin 32, a target 84 is attached to a target mounting slot 86 in the pivotal cam link 60 using a threaded target mounting fastener 88. The target mounting slot 86 may be curved, in which case the curved target mounting slot 86 is concentrically or approximately concentrically arranged in the pivotal cam link 60 relative to the pivot pin 32. Alternately, the target mounting slot 86 may be straight or otherwise configured. A sensor or switch 80 is attached to the sensor or switch housing 42 using a threaded sensor or switch mounting fastener 82, and is located proximate to an arc described by the target 84 as the pivotal cam link 60 pivots about pivot pin 32. In this way, the target 84 activates the sensor or switch 80 when the upper gripper jaw 26 and/or the lower gripper jaw 28 are clamped on a single workpiece 200.

The curved target mounting slot 86 and threaded target mounting fastener 88 illustrated in the embodiment of the invention shown in FIGS. 1 and 2 allow circumferential position adjustment of the target 84 relative to the pivotal cam link 60. In order to ensure proper orientation, such as radial orientation, of the target 84 relative to the pivotal cam link 60, a curved target flange 84A extends from the target 84 at least partially over the end of the pivotal cam link 60 adjacent to the curved target mounting slot 86, which end of the pivotal cam link 60 adjacent to the curved target mounting slot 86 is also concentrically or approximately concentrically arranged relative to the pivot pin 32. In order to ensure a precise reading of the position of the target 84 relative to the sensor or switch 80, a target projection 84B extends outwards from the target 84.

A cover 100 (not shown in FIG. 2) fits over the workings of the sensor or switch mechanism 40 and is securely retained in place by way of sensor or switch housing cover mounting slots 102 and at least one threaded cover retaining fastener 104. A sensor or switch lead 80A extends from the sensor or switch 80 through the sensor or switch housing 42, in order to provide communication from the sensor or switch 80, and is sealed against environmental contamination using a sensor or switch lead grommet 80B.

Figure 3A:
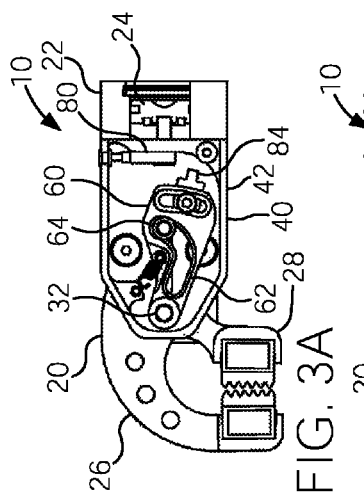
FIG. 3A shows a left hand view of a gripper having a sensor or switch mechanism and holding no workpiece, according to an embodiment of the present invention.
Figure 3B:
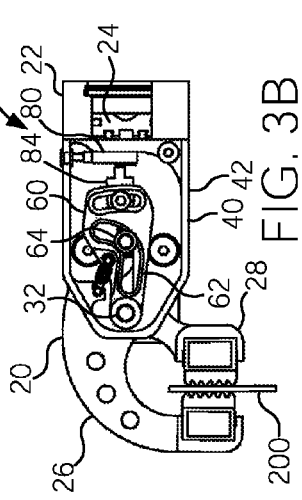
FIG. 3B shows a left hand view of a gripper having a sensor or switch mechanism and holding a single workpiece, according to an embodiment of the present invention.
Figure 3C:
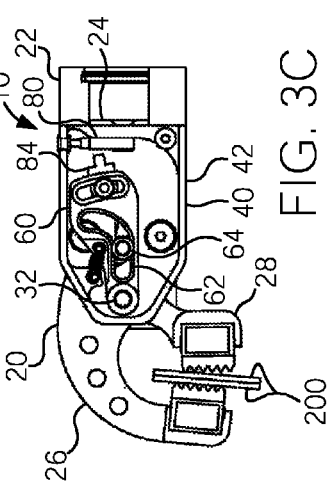
FIG. 3C shows a left hand view of a gripper having a sensor or switch mechanism and holding more than one workpiece, according to an embodiment of the present invention.

Turning now to FIGS. 3A, 3B, and 3C, a view is shown of the gripper and sensor or switch assembly 10 having no workpiece 200 between the upper gripper jaw 26 and the lower gripper jaw 28, having a single workpiece 200 between the upper gripper jaw 26 and the lower gripper jaw 28, and having two or more workpieces 200 between the upper gripper jaw 26 and the lower gripper jaw 28, respectively. The cover 100 is not shown in FIGS. 3A, 3B, and 3C, in order to more clearly show the functioning of the sensor or switch mechanism 40 within the sensor or switch housing 42 relative to the gripper mechanism 20 in the gripper body 22 as actuated by the fluid powered actuator 24. FIG. 3A again shows the gripper mechanism 20 having no workpiece 200 between the upper gripper jaw 26 and the lower gripper jaw 28. In this condition, the linearly reciprocating drive pin 64 moving within the closed curved cam slot 62 rotates the pivotal cam link 60 downward about the pivot pin 32, until the target 84 is not within range of the sensor or switch 80.

FIG. 3B again shows the gripper mechanism having a single workpiece 200 between the upper gripper jaw 26 and the lower gripper jaw 28. In this condition, the linearly reciprocating drive pin 64 moving within the closed curved cam slot 62 again rotates the pivotal cam link 60 downward. However, upon contact of the upper gripper jaw 26 and the lower gripper jaw 28 with the single workpiece 200, the linearly reciprocating drive pin 64 travels no further, so that the pivotal cam link 60 rotates no further downward about the pivot pin 32, and the target 84 is placed within range of the sensor or switch 80. FIG. 3C shows the gripper mechanism having multiple workpieces 200 between the upper gripper jaw 26 and the lower gripper jaw 28. In this condition, the linearly reciprocating drive pin 64 moving within the closed curved cam slot 62 again rotates the pivotal cam link 60 downward, but because the upper gripper jaw 26 and the lower gripper jaw 28 make contact with the multiple workpieces 200 before the upper gripper jaw 26 and the lower gripper jaw 28 are in their intended operating position, the linearly reciprocating drive pin 64 travels only a limited distance within the closed curved cam slot 62. The target 84, therefore, does not rotate sufficiently downward to come within range of the sensor or switch 80.

As illustrated in FIGS. 3A, 3B, and 3C, the pivotal cam link 60 amplifies the linear motion of the linearly reciprocating drive pin 64, in order to allow the sensor or switch 80 to better respond to the motion and relative proximity of the target 84. Specifically, the pivotal cam link 60 may pivot between about 10 degrees and about 15 degrees from the position in which the gripper and sensor or switch assembly 10 has no workpiece 200 between the upper gripper jaw 26 and the lower gripper jaw 28 to the position in which the gripper and sensor or switch assembly 10 has a single workpiece 200 between the upper gripper jaw 26 and the lower gripper jaw 28. The pivotal cam link 60 may further pivot between about 10 degrees and about 15 degrees from the position in which the gripper and sensor or switch assembly 10 has a single workpiece 200 between the upper gripper jaw 26 and the lower gripper jaw 28 and the position in which the gripper and sensor or switch assembly 10 has two or more workpieces 200 between the upper gripper jaw 26 and the lower gripper jaw 28. In this way, a single sensor or switch 80, as used in the illustrated embodiments of the present invention, is able to able to determine whether the gripper mechanism 20 is properly clamped upon a single workpiece 200, as opposed to being engaged with no workpiece 200, or as opposed to being improperly clamped upon two or more workpieces 200. Further, the sensor or switch 80 as used in other embodiments of the present invention, may be able to distinguish between the condition of being engaged with no workpiece 200 and the condition of being improperly clamped upon two or more workpieces 200, by determining if the target 84 is below or above the sensor or switch 80, respectively. Embodiments of the present invention may therefore utilize a sensor or switch of any of various types, such as a Hall Effect, optical, capacitive, photoelectric, inductive, Doppler, laser, magnetic, radar, ultrasonic, or even an electromechanical sensor or switch. As a non-limiting example of a method of determining if the target 84 is below or above the sensor or switch 80, the sensor or switch may read an optical, magnetic, or other difference built into the target 84 above and below the target projection 84B.

Each of the embodiments of the gripper and sensor or switch assembly 10 illustrated in FIGS. 1 through 3C are shown with the gripper mechanism 20 as a pull-to-clamp gripper mechanism 20. That is to say, the fluid powered actuator 24 moves away from the pivot pin 32 as the upper gripper jaw 26 and/or the lower gripper jaw 28 move from an unclamped position to a clamped position. However, it is contemplated that embodiments of the present invention may be applied to a gripper mechanism 20 employing a push-to-clamp arrangement, in which the fluid powered actuator 24 moves toward the pivot pin 32 as the upper gripper jaw 26 and/or the lower gripper jaw 28 move from an unclamped position to a clamped position. In this case, the closed curved cam slot 62 may remain as illustrated, so that the target 84 is above the sensor or switch 80 when there is no workpiece 200 between the upper gripper jaw 26 and the lower gripper jaw 28, and so that the target 84 is below the sensor or switch 80 when there are two or more workpieces 200 between the upper gripper jaw 26 and the lower gripper jaw 28. Alternately, the geometry of the closed curved cam slot 62 may be altered in a push-to-clamp arrangement, so that the target 84 is below the sensor or switch 80 when there is no workpiece 200 between the upper gripper jaw 26 and the lower gripper jaw 28, and so that the target 84 is above the sensor or switch 80 when there are two or more workpieces 200 between the upper gripper jaw 26 and the lower gripper jaw 28.

While this invention has been described with respect to at least one embodiment, the present invention can be further modified within the spirit and the scope of this disclosure. This application is therefore intended to cover any variations, uses, adaptations, or symmetric equivalents of the invention using its general principles. Further, this application is intended to cover such departures from the present disclosure as come within known or customary practice in the art to which this invention pertains.

What is claimed is:

1. A gripper and sensor or switch assembly, comprising:
   a gripper mechanism having a gripper body, an actuator one of connected to and integrated with said gripper body, a driving member connected to said actuator, and at least one movable jaw operably connected to said driving member;
   a sensor or switch mechanism connected to said gripper mechanism and having a pivotal cam link, said pivotal cam link having a cam slot;
   a drive pin connected to said driving member and engaged with said cam slot, said drive pin and said cam slot configured to convert linear reciprocal motion of said driving member to rotational motion of said pivotal cam link;
   a target one of attached to and integrated with said pivotal cam link;
   a sensor or switch positioned proximate to an arc described by said target upon said rotation of said pivotal cam link; and
   said pivotal cam link, said cam slot, said target, and said sensor or switch being arranged so that:
      said pivotal cam link pivots to place said target in a first position on said arc upon said at least one movable jaw closing upon no workpiece, said first position resulting in a first output of said sensor or switch;
      said pivotal cam link pivots to place said target in a second position on said arc upon said at least one movable jaw closing upon a single workpiece, said second position resulting in a second output of said sensor or switch;
      said pivotal cam link pivots to place said target in a third position on said arc upon said at least one movable jaw closing upon at least two workpieces, said third position resulting in a third output of said sensor or switch; and
      said first output of said sensor or switch being one of the same as and different from said third output of said sensor or switch.

2. The gripper and sensor or switch assembly of claim 1, wherein:
   said first position and said second position being separated by between about 10 degrees and about 15 degrees upon said arc; and
   said second position and said third position being separated by between about 10 degrees and about 15 degrees upon said arc.

3. The gripper and sensor or switch assembly of claim 1, wherein:
   said at least one movable jaw further comprises at least one pivotal jaw, and said pivotal cam link one of:
      pivoting on a common pivot pin with said pivotal jaw;
      pivoting on a pivot pin coaxial with a pivot pin upon which said at least one pivotal jaw pivots; and
      pivoting on a pivot pin non-coaxial with said pivot pin upon which said at least one pivotal jaw pivots.

4. The gripper and sensor or switch assembly of claim 1, wherein:
   said cam slot being one of:
   partially linear and partially arcuate;
   entirely arcuate;
   entirely linear;
   arcuate and having at least one arc of incrementally varying radii; and
   arcuate and having at least one arc of progressively varying radii.

5. The gripper and sensor or switch assembly of claim 1, wherein:
   said pivotal cam link having a target mounting slot, said target being attached to said pivotal cam link by way of said target mounting slot.

6. The gripper and sensor or switch assembly of claim 5, wherein:
   said target mounting slot further comprising a curved target mounting slot and being approximately concentric with the pivot axis of said pivotal cam link; and
   said target having at least one of a flange engaged with said pivotal cam link and providing radial orientation of said target, and a projection extending radially toward said sensor or switch.

7. The gripper and sensor or switch assembly of claim 1, further comprising:
   a roller, said drive pin engaging said cam slot by way of said roller; and
   an extension spring connected to said pivotal cam link and biasing said pivotal cam link to keep said roller in contact with an outer surface of said cam slot.

8. The gripper and sensor or switch assembly of claim 1, wherein:
   said gripper mechanism being arranged so that one of:
      movement of said actuator away from said at least one movable jaw causes said at least one movable jaw to move toward a clamped position; and movement of said actuator toward said at least one movable jaw causes said at least one movable jaw to move toward a clamped position.

9. A sensor or switch mechanism for a gripper mechanism having a gripper body, an actuator one of connected to and integrated with said gripper body, a driving member connected to said actuator, and at least one movable jaw operably connected to said driving member, comprising:
   a pivotal cam link, said pivotal cam link having a cam slot;
   a drive pin connected to the driving member and engaged with said cam slot, said drive pin and said cam slot configured to convert linear reciprocal motion of the driving member to rotational motion of said pivotal cam link;
   a target one of attached to and integrated with said pivotal cam link;
   a sensor or switch positioned proximate to an arc described by said target upon said rotation of said pivotal cam link; and
   said pivotal cam link, said cam slot, said target, and said sensor or switch being arranged so that:
      said pivotal cam link pivots to place said target in a first position on said arc upon the at least one movable jaw closing upon no workpiece, said first position resulting in a first output of said sensor or switch;
      said pivotal cam link pivots to place said target in a second position on said arc upon said at least one movable jaw closing upon a single workpiece, said second position resulting in a second output of said sensor or switch;
      said pivotal cam link pivots to place said target in a third position on said arc upon said at least one movable jaw closing upon at least two workpieces, said third position resulting in a third output of said sensor or switch; and
      said first output of said sensor or switch being one of the same as and different from said third output of said sensor or switch.

10. The sensor or switch mechanism of claim 9, wherein:
    said first position and said second position being separated by between about 10 degrees and about 15 degrees upon said arc; and
    said second position and said third position being separated by between about 10 degrees and about 15 degrees upon said arc.

11. The sensor or switch mechanism of claim 9, wherein:
    the at least one movable jaw further comprises at least one pivotal jaw, and said pivotal cam link one of:
       pivoting on a common pivot pin with said pivotal jaw;
       pivoting on a pivot pin coaxial with a pivot pin upon which said at least one pivotal jaw pivots; and
       pivoting on a pivot pin non-coaxial with said pivot pin upon which said at least one pivotal jaw pivots.

12. The sensor or switch mechanism of claim 9, wherein:
    said cam slot being one of:
    partially linear and partially arcuate;
    entirely arcuate;
    entirely linear;
    arcuate and having at least one arc of incrementally varying radii; and
    arcuate and having at least one arc of progressively varying radii.

13. The sensor or switch mechanism of claim 9, wherein:
    said pivotal cam link having a target mounting slot, said target being attached to said pivotal cam link by way of said target mounting slot.

14. The sensor or switch mechanism of claim 13, wherein:
    said target mounting slot further comprising a curved target mounting slot and being approximately concentric with the pivot axis of said pivotal cam link; and
    said target having at least one of a flange engaged with said pivotal cam link and providing radial orientation of said target, and a projection extending radially toward said sensor or switch.

15. The sensor or switch mechanism of claim 9, further comprising:
    a roller, said drive pin engaging said cam slot by way of said roller; and
    an extension spring connected to said pivotal cam link and biasing said pivotal cam link to keep said roller in contact with an outer surface of said cam slot.

16. The sensor or switch mechanism of claim 9, wherein:
    said cam slot being arranged so that one of:
       movement of the actuator away from the at least one movable jaw causes said pivotal cam link to pivot downward; and
       movement of the actuator away from the at least one movable jaw causes said pivotal cam link to pivot upward.

17. A method of sensing the number of workpieces being gripped by a gripper mechanism having a gripper body, an actuator one of connected to and integrated with said gripper body, a driving member connected to said actuator, and at least one movable jaw operably connected to said driving member, comprising the steps of:
    providing a pivotal cam link, said pivotal cam link having a cam slot;
    connecting a drive pin to the driving member and engaging said drive pin with said cam slot;
    configuring said drive pin and said cam slot to convert linear reciprocal motion of the driving member to rotational motion of said pivotal cam link;
    one of attaching and integrating a target with said pivotal cam link;
    positioning a sensor or switch proximate to an arc described by said target upon said rotation of said pivotal cam link; and
    arranging said pivotal cam link, said cam slot, said target, and said sensor or switch so that:
       said pivotal cam link pivots to place said target in a first position on said arc upon the at least one movable jaw closing upon no workpiece, said first position resulting in a first output of said sensor or switch;
       said pivotal cam link pivots to place said target in a second position on said arc upon said at least one movable jaw closing upon a single workpiece, said second position resulting in a second output of said sensor or switch;
       said pivotal cam link pivots to place said target in a third position on said arc upon said at least one movable jaw closing upon at least two workpieces, said third position resulting in a third output of said sensor or switch; and
    said first output of said sensor or switch being one of the same as and different from said third output of said sensor or switch.

18. The method of claim 17, wherein:
    said first position and said second position being separated by between about 10 degrees and about 15 degrees upon said arc; and
    said second position and said third position being separated by between about 10 degrees and about 15 degrees upon said arc.

19. The method of claim 17, further comprising the steps of:
 providing said pivotal cam link with a curved target mounting slot approximately concentric with the pivot axis of said pivotal cam link;
 attaching said target to said pivotal cam link by way of said curved target mounting slot;
 providing said target with least one of a flange engaged with said pivotal cam link and providing radial orientation of said target, and a projection extending radially toward said sensor or switch.

20. The method of claim 17, further comprising the steps of:
 providing a roller, and engaging said drive pin with said cam slot by way of said roller; and
 connecting an extension spring to said pivotal cam link and biasing said pivotal cam link to keep said roller in contact with an outer surface of said cam slot.

\* \* \* \* \*